United States Patent
Wagner et al.

(10) Patent No.: US 8,726,622 B2
(45) Date of Patent: May 20, 2014

(54) FEEDER ARM SAFETY STAND

(75) Inventors: Bradley J. Wagner, Orrtanna, PA (US); Christopher R. Aurand, Middleburg, PA (US); Herb M. Farley, Elizabethtown, PA (US); John Donald Watt, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 12/970,207

(22) Filed: Dec. 16, 2010

(65) Prior Publication Data
US 2012/0152109 A1  Jun. 21, 2012

(51) Int. Cl.
*A01D 34/00*  (2006.01)

(52) U.S. Cl.
USPC .............................. 56/15.9; 267/64.12; 92/15

(58) Field of Classification Search
USPC ............ 56/15.9, 15.6, 228; 92/15, 18, 20, 24, 92/27, 28, 19, 23; 267/64.12; 16/83, 84, 16/66
See application file for complete search history.

(56) References Cited

U.S. PATENT DOCUMENTS

| | | | |
|---|---|---|---|
| 352,835 A * | 11/1886 | Nicholson | 248/97 |
| 591,969 A * | 10/1897 | Hiekisch | 211/22 |
| 1,441,628 A * | 1/1923 | Leisse | 91/44 |
| 2,454,697 A | 10/1948 | Hilblom | |
| 2,491,354 A | 12/1949 | Acton | |
| 2,896,583 A * | 7/1959 | Stixrood | 92/19 |
| 2,917,277 A * | 12/1959 | Pine | 92/19 |
| 3,536,337 A | 10/1970 | Molnar | |
| 3,641,747 A | 2/1972 | Bobard | |
| 3,665,688 A | 5/1972 | Sheehan et al. | |
| 3,981,126 A | 9/1976 | Hocking | |
| 4,315,395 A | 2/1982 | Randall et al. | |
| 4,447,042 A * | 5/1984 | Masui | 254/90 |
| 4,536,009 A | 8/1985 | Ashworth | |
| 4,569,422 A | 2/1986 | Hoffman | |
| 4,815,712 A * | 3/1989 | Kawada | 254/89 H |
| 4,824,082 A * | 4/1989 | Schaupp | 267/120 |
| 4,909,357 A * | 3/1990 | Kawada | 187/207 |
| 4,947,705 A * | 8/1990 | Yates et al. | 74/529 |
| 5,009,566 A * | 4/1991 | Asche | 414/722 |
| 5,386,652 A * | 2/1995 | Ramun | 37/406 |
| 6,089,603 A | 7/2000 | Ackley | |
| 6,149,374 A * | 11/2000 | Dershem et al. | 414/685 |
| 6,182,796 B1 * | 2/2001 | Perlstein et al. | 187/208 |
| 6,615,570 B2 * | 9/2003 | Beck et al. | 56/10.2 E |
| 6,715,282 B1 | 4/2004 | Doveri | |
| 2007/0294990 A1 | 12/2007 | Coers et al. | |
| 2008/0086999 A1 | 4/2008 | Tippery et al. | |

FOREIGN PATENT DOCUMENTS

| | | |
|---|---|---|
| JP | 05032158 A | 2/1993 |
| JP | 406135305 A | 5/1994 |

* cited by examiner

*Primary Examiner* — Alicia Torres
(74) *Attorney, Agent, or Firm* — Patrick M. Sheldrake (57) ABSTRACT

A safety stand is provided for minimizing the effect of hydraulic failure in an agricultural harvester. The safety stand has a series of notches along a longitudinal edge of the safety stand which are designed to accept and received a protrusion affixed to a cylinder of a hydraulic cylinder which raises and lowers a feeder arm. When the feeder arm is raised, the hydraulic cylinder is in the full upright position, the safety stand can be lowered such that the protrusion enters and is held within a notch to prevent accidental downward movement of the feeder arm. If the notch fails, or the safety stand is not properly engaged, the longitudinal edge of the safety arm is allowed to follow the protrusion, until a subsequent notch is reached, which then engages the protrusion, safely stopping the downward path of the feeder arm.

17 Claims, 6 Drawing Sheets

FEEDER ARM SAFETY STAND

TECHNOLOGY FIELD

The invention relates to agricultural harvesters/feeders. More particularly, it relates to a safety mechanism for holding the feeder arm in an upright position to facilitate maintenance.

BACKGROUND

Headers on agricultural harvesters gather and cut the crops that are harvested. A typical header is an elongate laterally extending structure, typically 15-40 feet wide, that is supported on a feeder arm located on the front of the harvester vehicle. The header is vertically moveable using hydraulic cylinders that are coupled to the feeder arm at their forward ends and to the chassis of the harvester vehicle at their rear ends. The operator selectively raises and lowers the feeder arm and the header attached thereto by adjusting the length of the piston in the hydraulic cylinders.

In some instances, the hydraulic cylinders may not include hydraulic circuits to actively retract the pistons and lower the header. Instead, they rely on the considerable weight of the header to do that. They include hydraulic circuits that fill the head end of the cylinder to extend it, thus raising the header. When hydraulic fluid is released from the head end of the cylinders, the weight of the header and feeder house are sufficient to retract the cylinders. There is nothing to protect against or prevent the sudden downward fall of the header and feeder arm in the event the hydraulic system should fail or leak.

Occasionally, it becomes necessary to service the header or feeder arm, or to otherwise obtain access under the feeder arm. This of course creates the potentially hazardous situation of putting the operator or the maintenance personnel under a very large and heavy piece of farming equipment should the hydraulic cylinders fail. To minimize this risk, many harvesters have been outfitted with a safety stand. In a typical arrangement, the safety stand is a simple mechanical device, which pivots into place to physically prevent the hydraulic cylinder from retreating. The safety stand is essentially an elongated steel or iron lock out device, pivotally attached at one end to the header end of the piston of the hydraulic cylinder. When deployed, the lock out device is rotated into position such that it runs substantially parallel to the extended piston rod, and the end of the safety stand closest to the chassis physically engaged the header end of the hydraulic cylinder. The safety stand in this position allows only slight movement downward, until it physically engages the cylinder end to prevent further movement. In this position, the piston is physically incapable of further retreat into the cylinder. The header and feeder arm, accordingly stay in an upright position facilitating access underneath. When not in use, the safety arm is rotated upward and secured out of place, allowing free movement of the piston within the cylinder. One or more such hydraulic cylinders may be used on a given harvester, and one or more corresponding safety stands may be employed.

The current design has several shortcomings. The operator cannot engage the safety stand from inside the harvester vehicle. Current designs require the operator to raise the feed arm, climb out of the vehicle, lower the safety stand, climb back into the vehicle, lower the feed arm until the safety stand catches, and then to climb back out to perform the service required. All of this is hard on the operator who may have to climb up and down several times, which in addition to taking valuable time is also physically demanding.

Additionally, the operator has no way of knowing, from the cabin, whether or not the safety stand has been properly engaged. If the safety stand is engaged while the piston is not sufficiently extended, the end of the safety stand will not be in position to engage the cylinder end, but rather will ride along the surface of the cylinder.

Finally, if for some reason the safety stand fails, or is improperly deployed, there is no secondary safety feature to stop the feeder arm from dropping fully to the ground, should the hydraulics fail.

These and other problems exist in the current safety stand used in feeders and harvesters. A better, safer way is needed to protect our farmers and maintenance personnel in the field.

SUMMARY

Some embodiments of the invention provide a safety device for preventing or minimizing movement of a feeder arm of an agricultural harvester upon failure of the hydraulic system used to control the feeder arm. Some such embodiments include a safety stand pivotally mounted at the distal end of a piston rod and extending therefrom to a cylinder of the hydraulic system, such that the length of the safety stand is approximately equal to the desired piston rod length to be maintained. Some such embodiments include a remotely controlled member for raising and lowering the safety stand from a raised, disengaged position to a lowered, engaged position, such that in the raised position, the piston rod of the hydraulic system is freely moveable and when in the lowered position, the safety stand provides a mechanical stop preventing the piston from further retracting within the cylinder.

In some embodiments, the remotely controlled member is a second hydraulic system employing a piston and cylinder operably coupled at one end to the feeder arm and at the opposite end to the safety stand; such that the second hydraulic system raises and lowers the safety stand.

In some embodiments, the second hydraulic system is remotely controlled by the operator from within the harvester, thus preventing the need to climb in and out of the harvester to deploy the safety arm.

Some embodiments of the invention provide a safety system for preventing or minimizing movement of a feeder arm of an agricultural harvester upon failure of the hydraulic system used to control the feeder arm which include a piston and cylinder of the hydraulic system, wherein a distal end of the piston is rotatably affixed to the feeder arm, and the cylinder is rotatably affixed at the opposite end to a stationary part of the harvester. The cylinder is provided with a laterally projecting protrusion at its distal end. In some embodiments, there are two such projections, preferably 180° apart. The safety stand is pivotally mounted at the distal end of the piston such that the length of the safety stand is approximately equal to the desired piston rod length to be maintained. The safety stand defines at least one longitudinal edge, which defines a plurality of notches, wherein each notch is sized and configured to receive and accept the laterally projecting protrusion. The notches are preferably at regular intervals, and arranged such that should one fail or be missed, the next should be effective, thus minimizing retraction of the piston. The safety arm is rotatable between an upper position and a lowered position, where the lowered position corresponds to a locked position, where the projection engages one of the plurality of notches, thereby preventing further retraction of the piston within the cylinder.

In some embodiments, each of the plurality of notches is angled acutely toward the pivot end to facilitate holding the lateral protrusion within the notch until the feeder arm is raised.

In some embodiments, the safety stand has a generally U-shaped cross-section sized and configured to accept the diameter of the cylinder and to engage the protrusion at the longitudinal edge of the safety stand.

In some embodiments, each of the plurality of notches is separated by a portion of the longitudinal edge which may engage the lateral protrusion and direct the lateral protrusion into the next adjacent notch, when the feeder arm is being lowered.

In some embodiments, a lock out device is provided to hold the safety arm in an upper position to allow free movement of the piston within the cylinder.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Several additions or changes to the existing safety stand can dramatically improve its usability and performance. The invention relates to agricultural harvesters/feeders. More particularly, it relates to a safety mechanism for holding the feeder arm in an upright position to facilitate maintenance or access below the feeder arm. Some embodiments of the invention provide the advantages of allowing the operator to securely deploy the safety stand in the comfort and relative safety of the vehicle cab. Staying in the cab eliminates multiple trips to engage, re-engage, or disengage the safety stand—which results in the saving of time and effort. Some embodiments provide the further advantage of allowing the operator to remotely determine whether the safety stand is fully deployed. In yet other embodiments, there is a safety feature to stop the feeder arm from dropping fully to the ground, should the hydraulics fail or if for some reason the safety stand fails, or is improperly deployed.

Figure 1A:
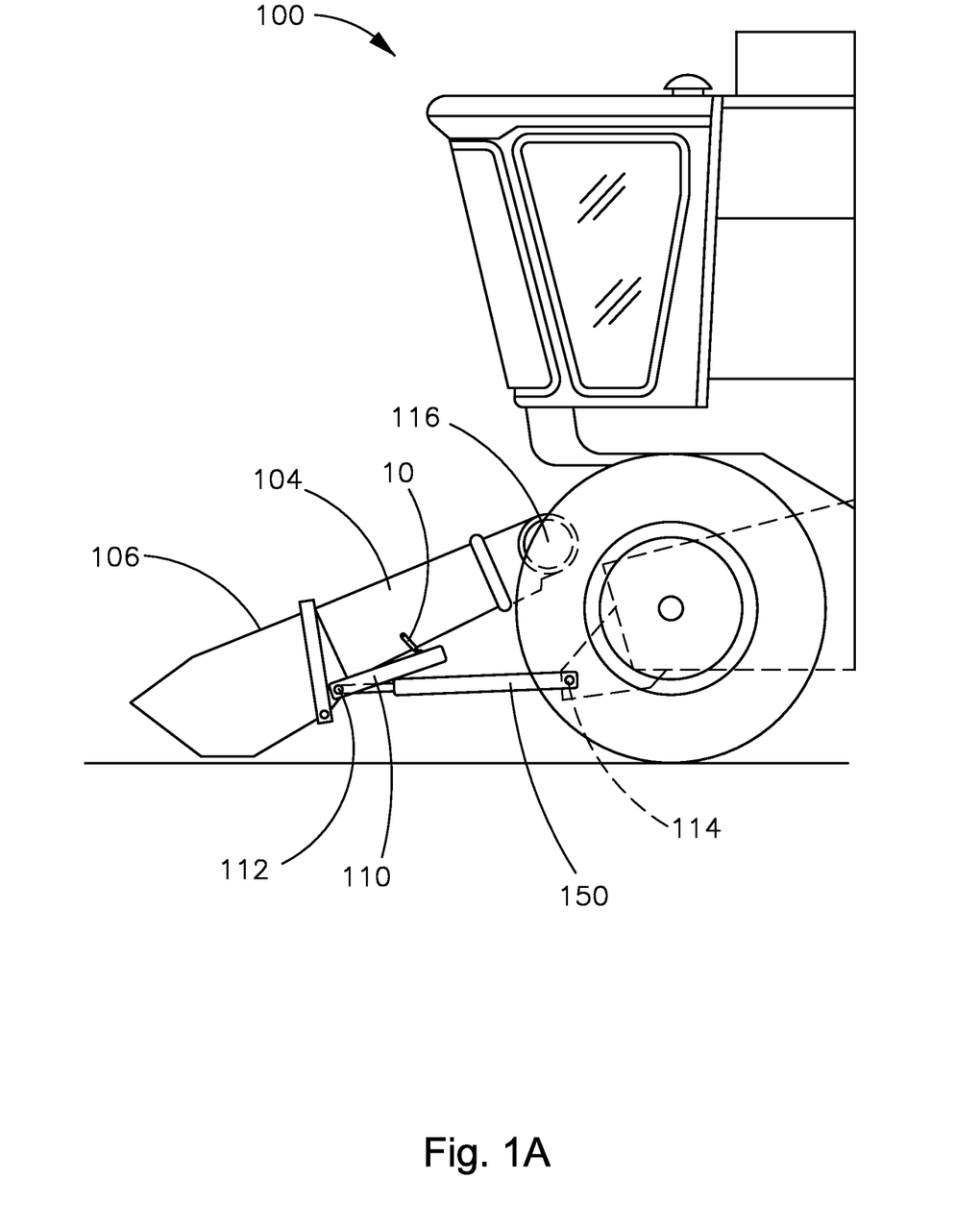
FIG. 1a is an environmental view, showing a harvester employing a feeder arm in the lowered position.
Figure 1B:
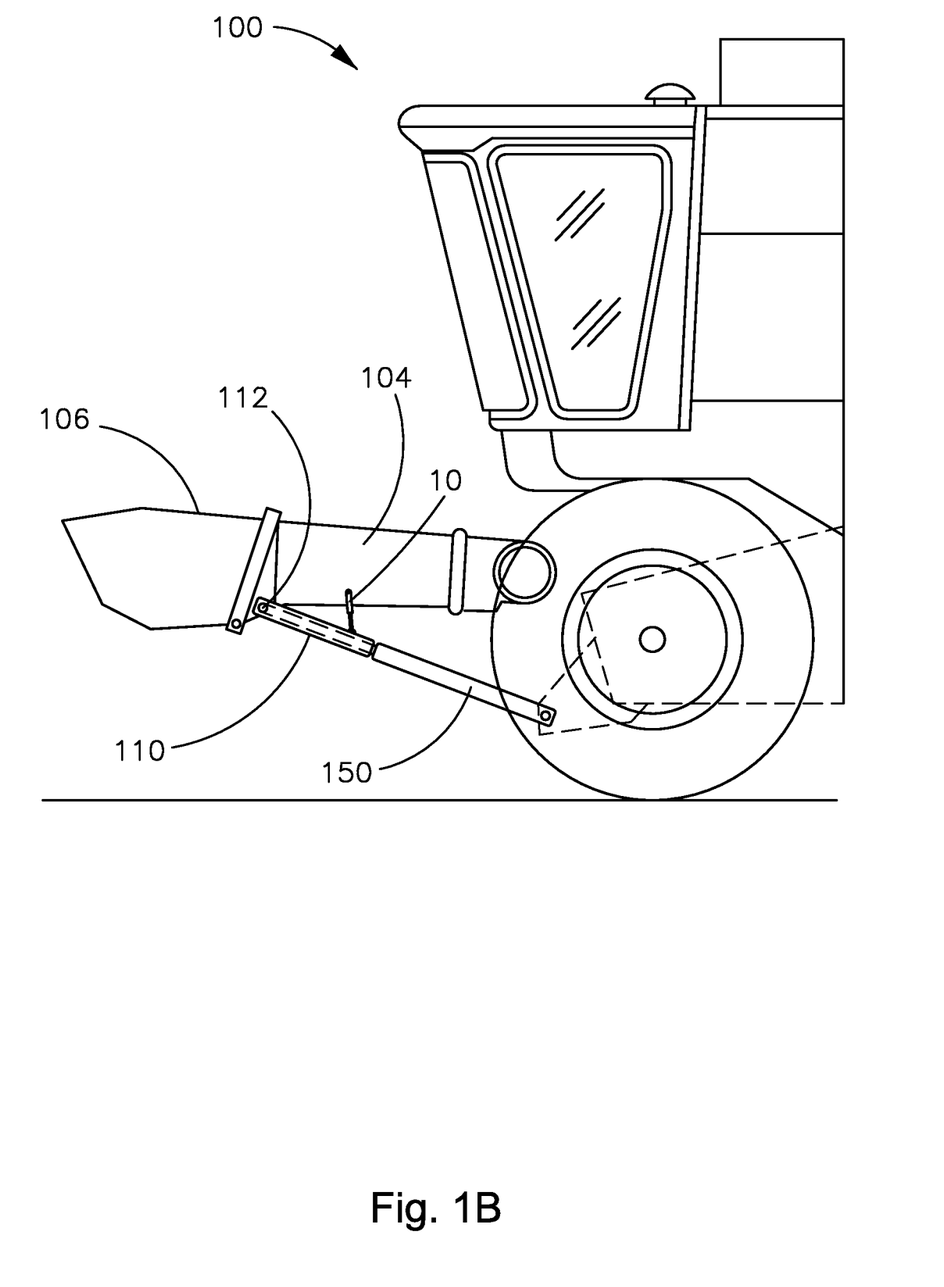
FIG. 1b is an environmental view, showing a harvester employing a feeder arm in the raised position.

FIGS. 1a and 1b illustrate a harvester 100 employing one embodiment of the invention. Headers 106 on agricultural harvesters gather and cut the crops that are harvested. A typical header 106 is an elongate laterally extending structure, typically 15-40 feet wide, that is supported on a feeder arm 104 located on the front of the harvester vehicle. The header 106 is vertically moveable using hydraulic cylinders 150 that are coupled to the feeder arm 104 at their forward ends 112 and to the chassis of the harvester vehicle at their rear ends 114. The operator selectively raises and lowers the feeder arm 104 and the header 106 attached thereto by adjusting the length of the piston 152 in the hydraulic cylinders 150.

In some instances, the hydraulic cylinders 150 may not include hydraulic circuits to actively retract the pistons 152 and lower the header 106. Instead, they rely on the considerable weight of the header 106 to do that. They include hydraulic circuits that fill the head end of the cylinder 150 to extend the piston 152, thus raising the header 106. When hydraulic fluid is released from the head end of the cylinder 150, the weight of the header 160 and feeder arm 104 are sufficient to retract the piston 152 within the cylinder 150. There is nothing to protect against or prevent the sudden downward fall of the header 106 and feeder arm 104 in the event the hydraulic system should fail or leak.

Occasionally, it becomes necessary to service the header 106 or feeder arm 104, or to otherwise obtain access under the feeder arm 104. This of course creates the potentially hazardous situation of putting the operator or the maintenance personnel under a very large and heavy piece of farming equipment should the hydraulic cylinders fail. To minimize this risk, the harvester have been outfitted with a safety stand 110. In a typical arrangement, the safety stand 110 is a simple mechanical device, which pivots into place to physically prevent the piston 152 from retreating within the cylinder 150. The safety stand 110 is essentially an elongated steel or iron lock out device, pivotally attached at one end to the header end 112 of the piston 152. When deployed, the lock out device is rotated into position such that it runs substantially parallel to the extended piston rod, and the end of the safety stand closest to the chassis physically engaged the header end of the hydraulic cylinder 150. The safety stand 110 in this position allows only slight movement downward, until it physically engages the cylinder end to prevent further movement. In this position, the piston 152 is physically incapable of further retreat into the cylinder 150. The header 106 and feeder arm 104, accordingly stay in an upright position facilitating access underneath. When not in use, the safety arm 110 is rotated upward and secured out of place, allowing free movement of the piston 152 within the cylinder 150. One or more such hydraulic cylinders may be used on a given harvester, and one or more corresponding safety stands may be employed.

Figure 2A:
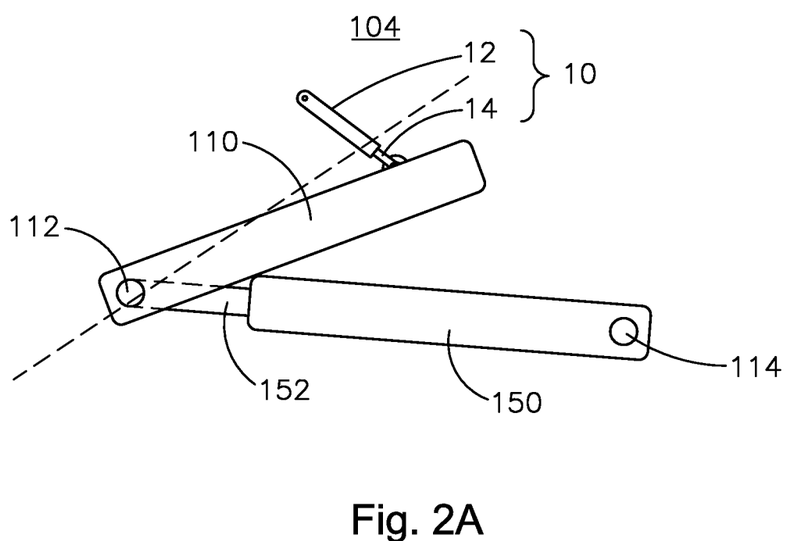
FIG. 2a is a safety device in accordance with some embodiments of the invention shown in a raised position.
Figure 2B:
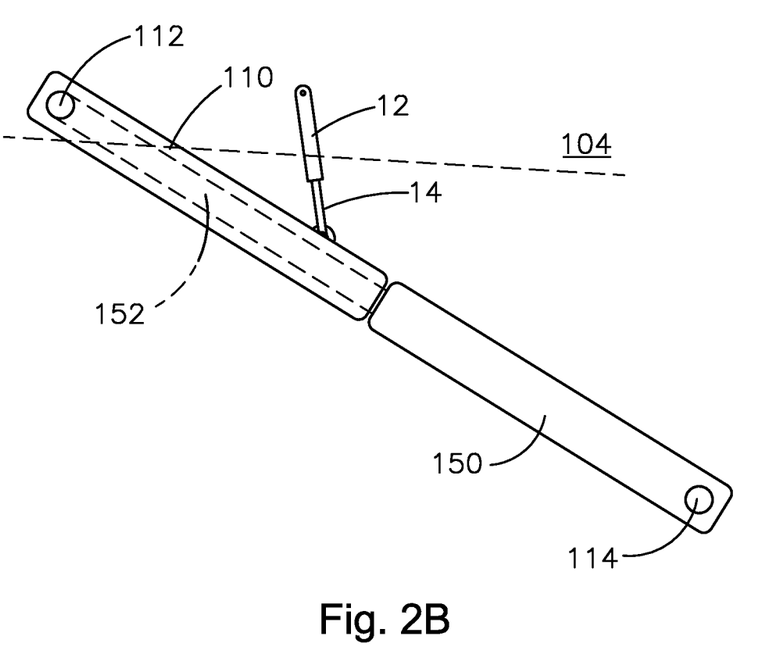
FIG. 2b is a safety device in accordance with some embodiments of the invention shown in a lowered position.

FIG. 1a shows the feeder arm 104 in a lowered position. FIG. 1b shows the feeder arm 104 in a raised position. FIGS. 2a and 2b are detailed views showing the relative positions of the feeder arm 104, the safety stand 110, the piston 152, cylinder 150. In use, the feeder arm 104 is raised and lowered depending upon field conditions and desired action. When maintenance is required, however, the feeder arm 104 is raised, and locked into that position as shown in FIGS. 1b and 2b. A conventional feeder/harvester is outfitted with a safety stand 110 to prevent accidental lowering (i.e. dropping) of the feeder arm 104 during servicing or other activities. The safety stand 110 is a simple lock out device generally having an elongated member having a U-shaped cross-section. The U-shaped cross-section is sized to fit over the piston, but not over the cylinder portion of the hydraulics. At its distal, feeder end, the safety stand 110 is pivotally attached to the piston end for rotation upwards, when not in use, and downwards when in use. When deployed, the safety stand engages the end of the cylinder to prevent accidental retraction of the piston within the cylinder. Notably, in accordance with some aspects of the invention, the safety stand 110 is provided with means for remotely lowering the safety stand from a stored position, as shown in FIGS. 1a and 2a, to a deployed position, as shown in FIGS. 1a and 2a, and vice versa.

Such means for raising or lowering the safety stand can be any suitable system. For example, a hydraulic system could be used to facilitate the raising and lowering of the safety stand. Alternatively, a geared system could be used, as could a pulley system or an electric motor. Combinations of these types of systems could also be employed. Such systems can be manually or electronically controlled.

As shown in generally in FIGS. 1a and 1b, and more specifically in FIGS. 2a and 2b, a second hydraulic system 10 can be used to raise and lower the safety stand 110. In some embodiments, the second hydraulic system 10 may be controlled by the operator from within the cab of the vehicle thereby preventing the operator from having to climb out of the machine. As depicted in FIGS. 2a, 2b, a hydraulic cylinder 12 and piston 14 are affixed at opposite ends to the feeder arm 104 and the safety stand 110. By extending the piston 14 out of the cylinder 12, the safety stand 110 can be lowered into position, as shown in FIG. 2b. When properly deployed, the safety stand 110 is positioned so that it engages the feeder cylinder 150 to prevent unwanted downward movement of the feeder piston 152. In some embodiments, a sensor (not shown) can be provided indicating that the safety arm 110 has been fully deployed so the operator will know that the safety arm 110 is in a fully engaged position, rather than riding improperly along the top of the cylinder 150. Reversing the action withdraws the safety stand 110 thereby allowing the feeder arm 104 a full range of movement.

Figure 3A:
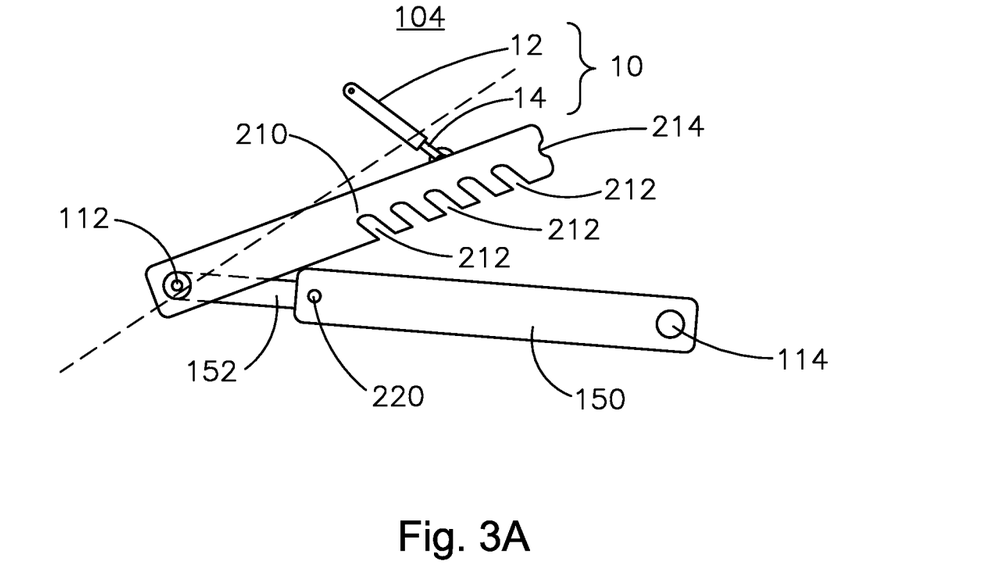
FIG. 3a is a safety device in accordance with some embodiments of the invention shown in a raised position.
Figure 3B:
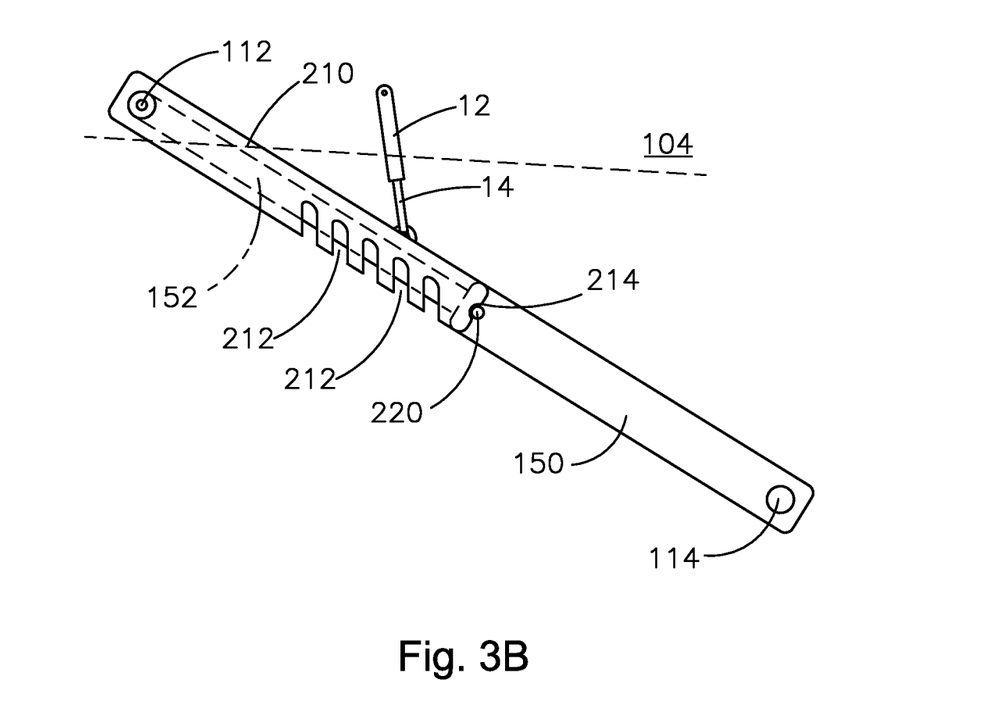
FIG. 3b is a safety device in accordance with some embodiments of the invention shown in a lowered position.
Figure 3C:
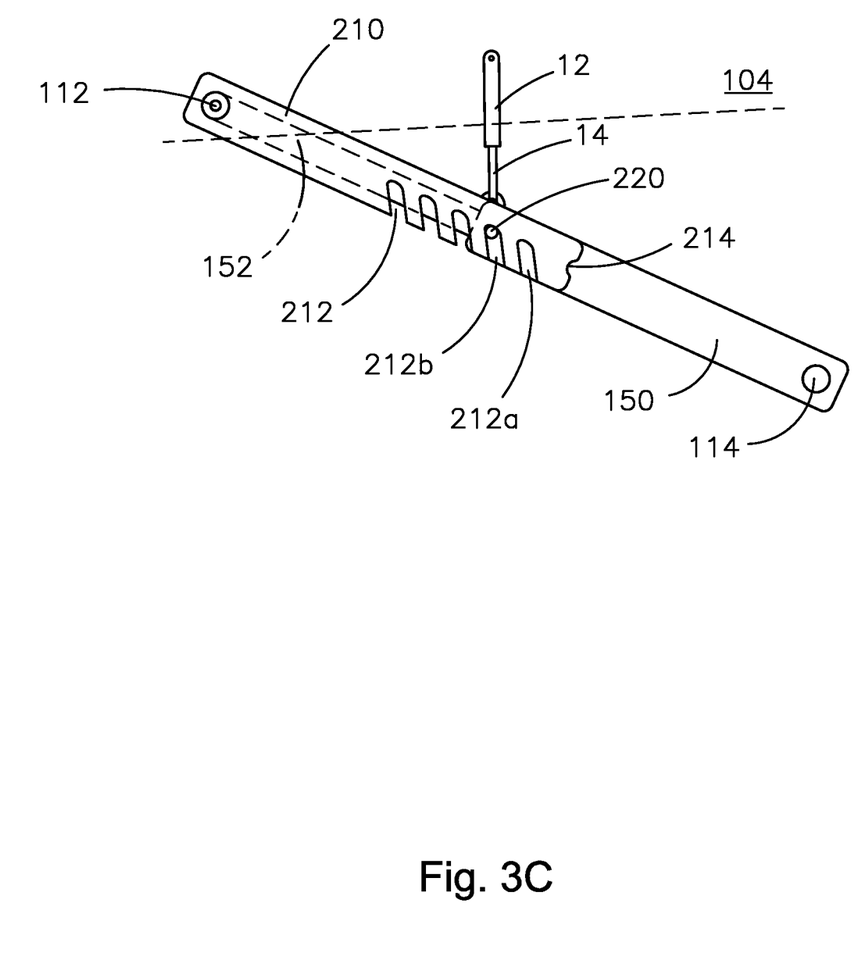
FIG. 3c is a safety device in accordance with some embodiments of the invention shown in an intermediate position.

FIGS. 3a-3c show another embodiment of the invention that could be used in conjunction with or independently of the system to raise and lower the safety stand described above. FIGS. 3a-3c show the optional system 10 for raising and lowering the safety stand. In these embodiments, the safety stand itself is altered to improve safety.

Unlike prior safety stands, the safety stand 210 according to some embodiments of the invention provides for multiple predetermined stops in the event one should fail or the device is improperly deployed.

Figure 4:
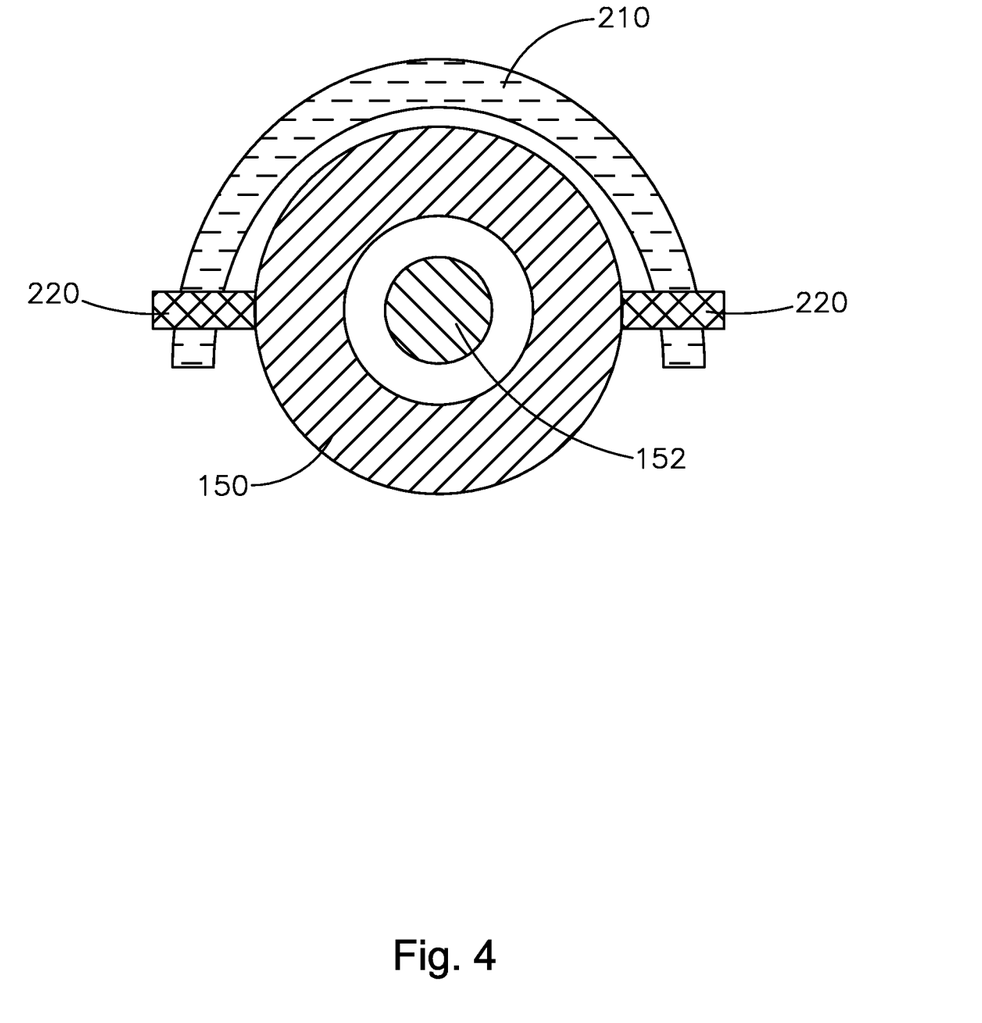
FIG. 4 is a cross-sectional view of a safety device in accordance with some embodiments of the invention, shown in a lowered position.

FIGS. 3a-3c, show a safety stand 210 which is rotatably affixed at the feeder end 154 of the piston 152. The safety stand 210 again can form a roughly elongated body having a U-shaped cross-section, as seen in FIG. 4. In the embodiment shown in FIGS. 3a-3c, the safety stand 210 is provided with a plurality of notches 212 along at least one longitudinal edge of the safety stand 210. The cylinder 150 of the hydraulic system is provided with at least one laterally extending protrusion 220. The notches 212 are sized to accept such protrusion(s) 220. The notches 212 are preferably disposed along the length of the safety stand 210 at regular intervals and in mated, opposed pairs. When deployed and fully engaged, as shown in FIG. 3b, the protrusion(s) 220 on the cylinder are accepted into and fully engaged by one of the plurality of notches 212. In this manner, the piston 152 is prevented from further retraction into the cylinder 150, and thus, the feeder arm 104 is held safely in place even in the event of hydraulic failure.

In contrast to prior methods, some embodiments of the safety stand 210 protect against mis-deployment of the safety stand 210. In the event that the operator engages the safety stand 210 in a manner that the end or the first notch 212a is not engaged, the piston 152 will retract, but only so far as the next adjacent notch 212b, since the protrusion(s) engage the edges of the safety stand 210 and follow it until the next notch is reached, which then will engage the protrusion 220. FIG. 3c shows this intermittent position. In this manner the amount of drop involved can be minimized, creating a safer work environment.

Of course, the operator could actively choose to engage the safety stand when the feeder arm is at less than a fully raised position, in doing so, the operator could select a position corresponding to any of the notches and be assured of his safety in such an intermittent position.

In some embodiments, the end of the safety stand 210 may be provided with a notch or recess 214 to engage the protrusion 220, as shown in FIG. 3b. In the existing safety stands, the end of the safety stand engages the end of the cylinder, which could be prone to slippage, by providing a notch in the end to engage the protrusion, a full extension can be safely secured.

In some embodiments, the notches 212 are angled to facilitate engaging the protrusions 220 to prevent accidental drop, but also to facilitate the raising of the feeder arm 104. As can bee seen from the figures, when the safety arm 220 is engaged, the piston 152 may not retract into the cylinder 150. On the other hand, even when engaged, with the angled notches 212, the piston 152 maybe extended. In this instance, the safety stand 210 merely rides along the protrusions 220 as the piston 152 extends. In the event of a failure, as feeder arm 104 falls under the force of gravity and the piston 152 retracts, the safety stand 210 will ride along the protrusion 220 in the opposite direction, until the protrusion 220 safely reaches the next notch 212, whereupon the piston 152 will end its retraction, and the feeder arm 104 will stop.

In some embodiments, the amount of drop between notches is controlled by placing the notches at regular intervals. Due to the angles involved, the distance between notches does not equal the amount of vertical drop of the feeder arm 104. Rather, the vertical drop is less than the associated distance between notches. Thus, the distance between notches can be chosen in accordance with an acceptable amount of drop keeping in mind safety concerns. For example, the notch distance can be calculated to achieve a drop of less than say 12 inches, or less than 6 inches, or any desired number. Likewise, the notches could be spaced at regular intervals unrelated to the amount of drop, but rather with manufacturing considerations in mind. Notches could be separated by any suitable distance, but preferably are separated at least by the diameter or width of the protrusion.

The safety stand and protrusion can be made of any suitable material, keeping in mind the amount of weight it needs to support in the event of a total hydraulic failure. Steel and iron are natural choices. The protrusion can be retrofitted by welding or other techniques, or formed as part of the hydraulic cylinders, or as part of a sleeve encircling the cylinder.

Those of skill in the art will recognize that although the invention has been described and drawn as having a series of notches mated to a pair of protrusions, other arrangements could be made. For example, either or both of the safety stand and the cylinder could be provided with a series of physical stops, the cylinder could be provided with a spring-loaded protrusion that engages a hole or notch in the safety stand, but can be retracted when raising or lowering the feeder arm 104, or other suitable arrangement.

Also contemplated in some embodiments of the invention, is the means for raising and lowering the safety arm in combination with the safety stand having predetermined stops.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A safety system for a harvester comprising:
a feeder arm configured for attachment of a header to the harvester;
a piston and cylinder of a hydraulic system for adjusting the position of the feeder arm with respect to a chassis of the harvester, wherein a first end of said piston is rotatably affixed to the feeder arm and a second end of said piston is receivable within said cylinder, the cylinder has a first end rotatably affixed to a stationary part of the harvester, the cylinder has a second end for receiving the piston;
a laterally extending protrusion fixed to the second end of said cylinder;
a safety stand having a first end pivotally mounted at the first end of the piston, the safety stand having a second end freely rotatable;
wherein said safety stand defines at least one longitudinal edge which defines a plurality of notches each notch extending inward from a respective opening along the edge, wherein each notch is sized and configured to receive and accept said laterally extending protrusion;
wherein said safety stand is rotatable between a raised, disengaged position and a lowered, engaged position, where said protrusion engages one of said plurality of notches, thereby preventing further retraction of the piston within the cylinder, and when a recess engages the protrusion in the lowered position, the safety stand is in a fully extended position and secures the feeder arm in a fixed position with respect to the chassis by preventing the piston from retracting within the cylinder; and
wherein said plurality of notches comprise opposing walls on either side of the openings along the longitudinal edge that slope from the openings toward the first end of the piston and configured to prevent movement of the protrusion in opposing directions perpendicular to the direction of movement of the piston within a plane of rotation of the arm.

2. The safety system of claim 1, wherein at least two laterally projecting protrusions are placed approximately 180° from one another about the circumference of said cylinder and said safety stand defines a second longitudinal edge which defines a second plurality of notches, wherein each of said second plurality of notches is sized and configured to receive and accept one of said laterally projecting protrusions.

3. The safety system of claim 1, wherein said safety stand has a generally U-shaped cross-section sized and configured to accept the diameter of the cylinder and to engage said protrusion.

4. The safety system of claim 1, wherein each of said plurality of notches is separated by a portion of said longitudinal edge which may engage the lateral protrusion and direct said lateral protrusion into the next adjacent notch when the feeder arm is being lowered.

5. The safety system of claim 1, wherein the length of the safety stand is approximately equal to a desired piston length to be maintained and the second end of the safety stand has a recess configured for engagement with the protrusion, wherein the recess has an opening oriented in a different direction from the openings of the notches.

6. The safety system of claim 1, wherein the system further comprises: a remotely controlled member rotatably mounted to the feeder arm for raising and lowering said safety stand between the raised, disengaged position to the lowered, engaged position.

7. The safety system of claim 6, wherein said remotely controlled member is a second hydraulic system employing a piston and cylinder operably coupled at one end to the feeder arm and at the opposite end to the safety stand; such that said second hydraulic system raises and lowers said safety stand.

8. The safety system of claim 7, wherein said second hydraulic system is remotely controlled by the operator from within the harvester.

9. The safety system of claim 7, wherein the piston of the second hydraulic system is configured to: (i) move in a direction away from the feeder arm when the piston of the second hydraulic system expands and (ii) move in a direction toward the feeder arm when the piston of the second hydraulic system retracts.

10. The safety system of claim 7, wherein the piston of the second hydraulic system is configured to: (i) expand to lower the safety stand to the lowered position corresponding to the locked position and (ii) retract to raise the safety stand and disengage the safety stand from the locked position.

11. The safety system of claim 7, wherein the piston of the second hydraulic system is configured to: (i) expand in a direction toward the piston of the hydraulic system to lower the safety stand to the lowered position corresponding to the locked position and (ii) retract in a direction away from the piston of the hydraulic system to raise the safety stand to the upper position.

12. The safety system of claim 7, wherein the piston of the second hydraulic system is configured to: (i) move in a linear direction as it expands and retracts and (ii) move in a rotational direction as it expands and retracts.

13. The safety system of claim 1, wherein one or more of said plurality of notches are U-shaped.

14. A safety system for a harvester comprising:
a feeder arm configured for attachment of a header to the harvester;
a piston and cylinder of a hydraulic system configured for controlling the height of the feeder arm with respect to a chassis of the harvester, wherein a first end of said piston is rotatably affixed to the feeder arm and a second end of said piston is receivable within said cylinder, the cylinder has a first end rotatably affixed to the harvester, the cylinder has a second end for receiving the piston;
a safety stand having a first end pivotally mounted at the first end of the piston, the safety stand having a second end freely rotatable, such that the length of the safety stand is approximately equal to a desired piston length to be maintained; and
a second hydraulic system employing a piston and cylinder operably coupled at one end to the feeder arm and at the opposite end to the safety stand; such that said second hydraulic system raises and lowers said safety stand with respect to the feeder arm, wherein said safety stand is rotatable between an upper position and a lowered position, and wherein the piston of the second hydraulic system is configured to: (i) move in a direction away from the feeder arm when the piston of the second hydraulic system expands and (ii) move in a direction toward the feeder arm when the piston of the second hydraulic system retracts.

15. The safety system of claim 14, wherein the piston of the second hydraulic system is rotatably mounted to the feeder arm and configured to: (i) expand to lower the safety stand to the lowered position corresponding to the locked position and (ii) retract to raise the safety stand and disengage the safety stand from the locked position.

16. The safety system of claim 14, wherein the piston of the second hydraulic system is configured to: (i) expand in a direction toward the piston of the hydraulic system to lower the safety stand to the lowered position corresponding to the locked position and (ii) retract in a direction away from the piston of the hydraulic system to raise the safety stand to the upper position.

17. The safety system of claim 14, wherein the piston of the second hydraulic system is configured to: (i) move in a linear direction as it expands and retracts and (ii) move in a rotational direction as it expands and retracts.

\* \* \* \* \*